March 16, 1926.  1,577,216
W. H. FISHER
LEAF SPRING LUBRICATING STRUCTURE
Filed Feb. 16, 1924

William H. Fisher
INVENTOR

BY *Victor J. Evans*
ATTORNEY

WITNESS:

Patented Mar. 16, 1926.

1,577,216

UNITED STATES PATENT OFFICE.

WILLIAM H. FISHER, OF PHILADELPHIA, PENNSYLVANIA, ASSIGNOR OF ONE-HALF TO HERMAN JONAS, OF PHILADELPHIA, PENNSYLVANIA.

LEAF-SPRING-LUBRICATING STRUCTURE.

Application filed February 16, 1924. Serial No. 693,349.

*To all whom it may concern:*

Be it known that I, WILLIAM H. FISHER, a citizen of the United States, residing at Philadelphia, in the county of Philadelphia and State of Pennsylvania, have invented new and useful Improvements in Leaf-Spring-Lubricating Structures, of which the following is a specification.

This invention relates to vehicle springs of the laminated type of leaf spring, such as used on motor vehicles and an object of the invention is to provide a construction whereby the engaging surfaces of the leaves of the spring may be lubricated thoroughly and efficiently to prevent rusting and the consequent deterioration of the springs, as well as to prevent the squeeking or undesirable noises frequently made by springs when improperly lubricated.

It is a well known fact that considerable work and time are required under the present construction of vehicle springs, to properly lubricate the springs, and as a result numerous motorists simply ignore the lubrication of the springs which frequently cause undesirable noises and often results in the breaking of the springs under strains.

More specifically, the invention comprehends the provision of leaf springs disposed in laminated relation which have grooves undercut in their undersurfaces, each of said grooves having communication through a transverse passage-way or duct with the groove in the spring leaf next therebelow to permit a passage of any lubricant from a suitable supply source to each of the grooves, and also to arrange the grooves in such manner as to cause effective lubrication of the wearing or engaging surfaces of the springs during movement of the springs while in operation.

Figure 1:
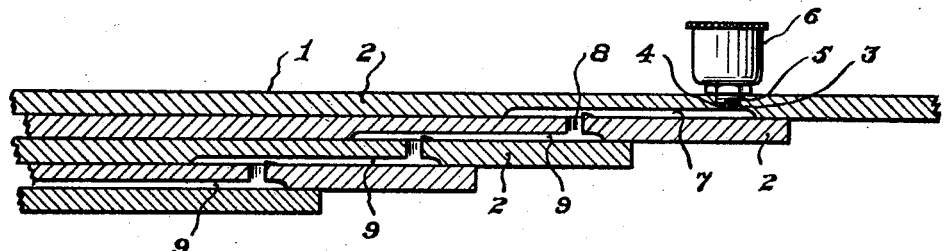

Other objects of the invention will appear in the following detail description, and in the accompanying drawings wherein:

Figure 1—is a fragmentary section through a vehicle spring structure showing the oil or lubricating grooves and ducts cut therein.

Figure 2:
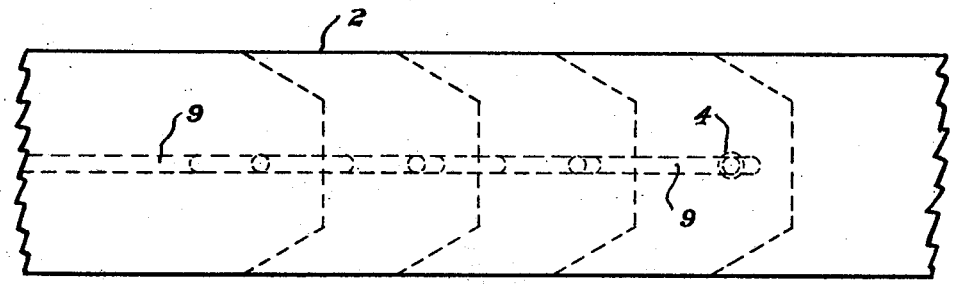

Figure 2—is a top plan of the improved spring structure.

Figure 3:
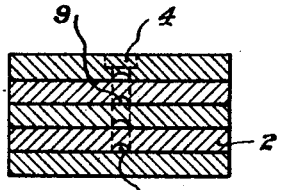

Figure 3—is a vertical section through the improved spring structure.

Figure 4:
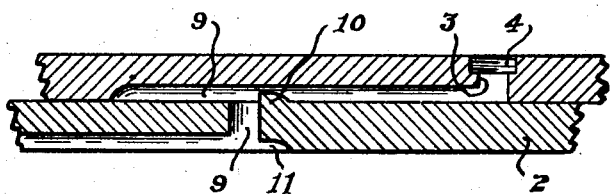

Figure 4—is an enlarged detail section through a part of the spring structure.

Figure 5:
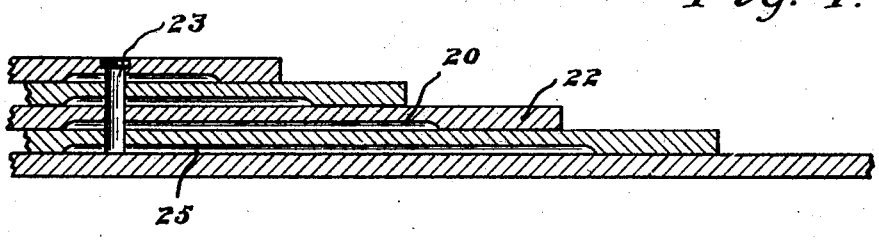

Figure 5—is a longitudinal section through a modified form of the spring.

Referring more particularly to the drawings, the spring structure 1 is of any approved type used on motor vehicles and is composed of a plurality of leaves 2 disposed in superposed abutting engagement and gradually decreasing in length from the uppermost leaf spring to the lowermost leaf. The uppermost spring leaf 2 is provided with a vertical opening or duct 3 therein a short distance inwardly from the outer end of the second spring leaf 2, and the opening 3 is counter-bored as shown at 4, to receive the threaded stem 5 of an oil cup 6 of any approved construction. The duct 3 communicates with a longitudinally extending groove 4 cut in the undersurface of the uppermost leaf 2 and extending inwardly from the duct 3. The groove 7 is preferably positioned equi-distant of the side edges of the leaf, as clearly shown in Figure 2 of the drawings. However, it is to be understood, that more than one groove may be provided without departing from the spirit of this invention.

By particular reference to Figure 1 of the drawings, it will be noted that the groove 7 extends outwardly towards the end of the leaf 2, a short distance beyond the duct 3 so as to permit lubricant to flow back towards the end of the spring for effectively lubricating the end of the second leaf 2, as well as lubricating the surface of the upper leaf 2 which engages the second leaf. The second leaf 2 is provided with a transversely extending duct 8 which has communication with a groove 7 and with a groove 9 in the third left 2, and as clearly shown in Figure 1 of the drawings, each of the leaves, with the exception of the lowermost leaf 2 is provided with a transverse duct 8 and a longitudinally extending groove 9; all of which are connected in sequence, and in step-by-step relation, so that the lubricant flowing from the cup 6 will flow through the various grooves and ducts in a step-by-step manner for properly lubricating the various leaves of the springs. All of the grooves 7 and 9 project beyond the ducts 8, so as to permit lubricant to flow downwardly between the respective leaves 2.

Owing to the fact that the leaves usually incline downwardly from their upper ends towards their centers, it is desirable to provide means for retaining a limited amount of lubricant in which the major portions of the grooves 7 and 9 that is between the duct 8 or 9 which serves as the inlet duct for the respective grooves for the duct which serves as the outlet for the respective groove so as to provide a quantity of lubricant therein for lubricating the adjacent engaging surfaces of the various leaves, and to provide for this construction. Each of the leaves has a lug 10 formed therein at one side of the outlet duct of the groove, as clearly shown in Figure 4 of the drawings. The lugs 10 are preferably formed by punching a portion of the spring leaves outwardly, causing a corresponding recess 11 and the lugs are of sufficient width as to span or extend across the various grooves, forming a dam in the grooves for the purpose of retaining a certain amount of lubricant therein. The movement of the springs during the travel of a vehicle equipped therewith will permit the lubricant to seat between them and effectively lubricate the engaging surfaces of the various leaves, eliminating undesirable noises, preventing rust and excessive wear on the springs.

In Figure 5 of the drawings, a modified form of the invention is shown in which the spring structure 20 is of the type in which the sequence of the leaves are reversed with respect to the type shown in Figures 1 to 4 inclusive, that is, the leaves gradually increases in length from the uppermost to the lowermost leaf, and they incline downwardly towards their ends. Some motor vehicles such as the "Ford" use this type of spring, and to permit the proper lubrication of the various leaves 22, all of the leaves, with the exception of the lowermost one are drilled to provide a continuous duct 23 with which a suitable oil cup 24 is connected. Each of the leaves 22, with the exception of the lowermost leaf is provided with a longitudinally extending groove 25 cut in its undersurface which communicates with the duct 23, and extends for the major portion of its length towards the ends of the leaves. However, each of the grooves project inwardly towards the center of the various leaves, from the duct 23, so as to permit lubrication of the central portion of the springs and also to permit communication between the duct 23 and the groove in case extreme accuracy is not employed in the forming of either the duct or the grooves.

It is, of course, to be understood, that the invention may be constructed in various other manners, and the parts associated in different relations, and therefore, I do not desire to be limited in any manner, except as set forth in the claims hereunto appended.

What I claim is:

1. A laminated leaf spring comprising a plurality of spring leaves disposed in superposed relation, said spring leaves having longitudinally extending grooves cut in their undersurfaces and being provided with transversely extending ducts establishing communication between the respective grooves, said ducts positioned intermediate the ends of the grooves and lugs struck from said springs upwardly into the grooves and forming dams in said grooves for retaining a limited quantity of lubricant in portions of the grooves.

2. A laminated leaf spring comprising a plurality of spring leaves disposed in superposed relation, said spring leaves having longitudinally extending grooves cut in their undersurfaces and being provided with transversely extending ducts establishing communication between the respective grooves, said ducts positioned intermediate the ends of the grooves and arranged whereby lubricant will travel in a step-like path through the various grooves and ducts, and lugs struck from said springs upwardly into the grooves and forming dams in said grooves for retaining a limited quantity of lubricant in portions of the grooves.

In testimony whereof I affix my signature.

WILLIAM H. FISHER.